(12) United States Patent
Nakamura et al.

(10) Patent No.: US 8,770,534 B2
(45) Date of Patent: Jul. 8, 2014

(54) LOCK MECHANISM FOR SEAT TRACK SLIDE DEVICE

(75) Inventors: Motohisa Nakamura, Kakamigahara (JP); Takayuki Ogasawara, Kakamigahara (JP)

(73) Assignee: Gifu Auto Body Co., Ltd., Gifu-Ken (JP)

( * ) Notice: Subject to any disclaimer, the term of this patent is extended or adjusted under 35 U.S.C. 154(b) by 476 days.

(21) Appl. No.: 13/034,105

(22) Filed: Feb. 24, 2011

(65) Prior Publication Data

US 2012/0132777 A1    May 31, 2012

(30) Foreign Application Priority Data

Nov. 25, 2010  (JP) ................. 2010-262660

(51) Int. Cl.
*B60N 2/08* (2006.01)
(52) U.S. Cl.
CPC .................. *B60N 2/0818* (2013.01)
USPC ....................... 248/429; 296/65.13
(58) Field of Classification Search
CPC .............................. B60N 2/085; B60N 2/0818
USPC ............ 248/429, 430, 424; 296/65.13, 65.15, 296/65.12; 297/344.1; 292/194–195, 200, 292/219–220, 226; 403/331
See application file for complete search history.

(56) References Cited

U.S. PATENT DOCUMENTS

| | | | |
|---|---|---|---|
| 5,028,028 A | 7/1991 | Yamada et al. | |
| 5,167,393 A | 12/1992 | Hayakawa et al. | |
| 6,186,595 B1 * | 2/2001 | Ward et al. | 297/378.1 |
| 6,286,799 B1 | 9/2001 | Fujii | |
| 6,305,746 B1 | 10/2001 | Ikegaya et al. | |
| 7,066,521 B2 * | 6/2006 | Jung et al. | 296/65.13 |
| 7,229,117 B2 * | 6/2007 | Okuda et al. | 296/64 |
| 7,314,204 B2 * | 1/2008 | Kohmura | 248/430 |
| 8,469,328 B2 * | 6/2013 | Nakamura et al. | 248/430 |
| 2005/0205746 A1 * | 9/2005 | Jung et al. | 248/429 |
| 2006/0261624 A1 * | 11/2006 | Okuda et al. | 296/65.13 |
| 2007/0069099 A1 * | 3/2007 | Kohmura | 248/430 |
| 2008/0048476 A1 | 2/2008 | Kojima et al. | |
| 2009/0032670 A1 | 2/2009 | Yoshida et al. | |
| 2011/0121154 A1 * | 5/2011 | Kimura et al. | 248/429 |
| 2012/0132777 A1 | 5/2012 | Nakamura et al. | |
| 2012/0132778 A1 | 5/2012 | Nakamura et al. | |

FOREIGN PATENT DOCUMENTS

| | | |
|---|---|---|
| JP | 2005-225262 | 8/2005 |
| JP | 2005-225386 | 8/2005 |
| JP | 2006-315531 | 11/2006 |
| JP | 2010-030461 | 2/2010 |
| JP | 2010-100077 | 5/2010 |

* cited by examiner

*Primary Examiner* — Anita M King
*Assistant Examiner* — Ingrid M Weinhold
(74) *Attorney, Agent, or Firm* — Caesar, Rivise, Bernstein, Cohen & Pokotilow, Ltd.

(57) ABSTRACT

A seat track slide device includes a pair of seat tracks. Each of the seat tracks has a lower rail, an upper rail, a lock lever, and a handle. Through manipulation of the handle, each seat track 3 is capable of switching the associated upper rail to a locking state and an unlocking state by selectively engaging and disengaging the lock lever with respect to the lower rail. In a support portion, projections of arm plates of the lock lever are engaged with the support holes of the side plates. The support portion pivotally supports the lock lever in the upper rail. The top plate of the upper rail has a stopper plate, that is held between stopper plates of arm plates of the lock lever.

6 Claims, 6 Drawing Sheets

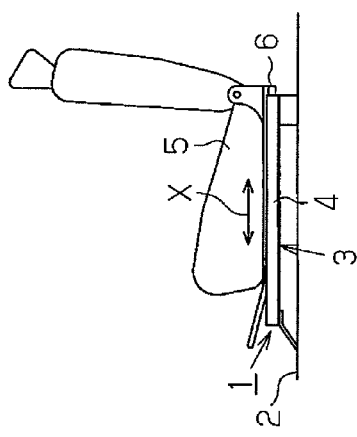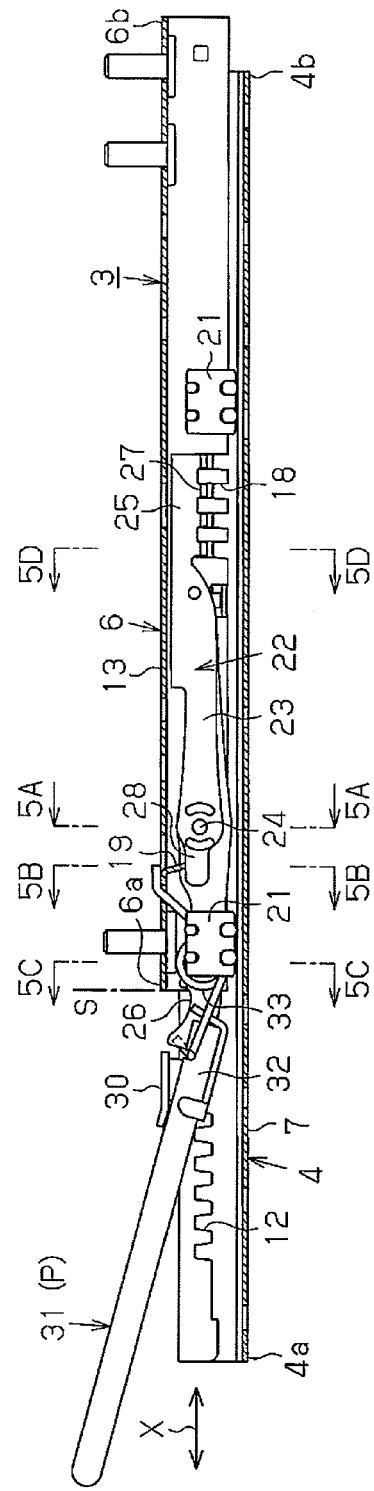
Fig.1 (a)
Fig.1 (b)

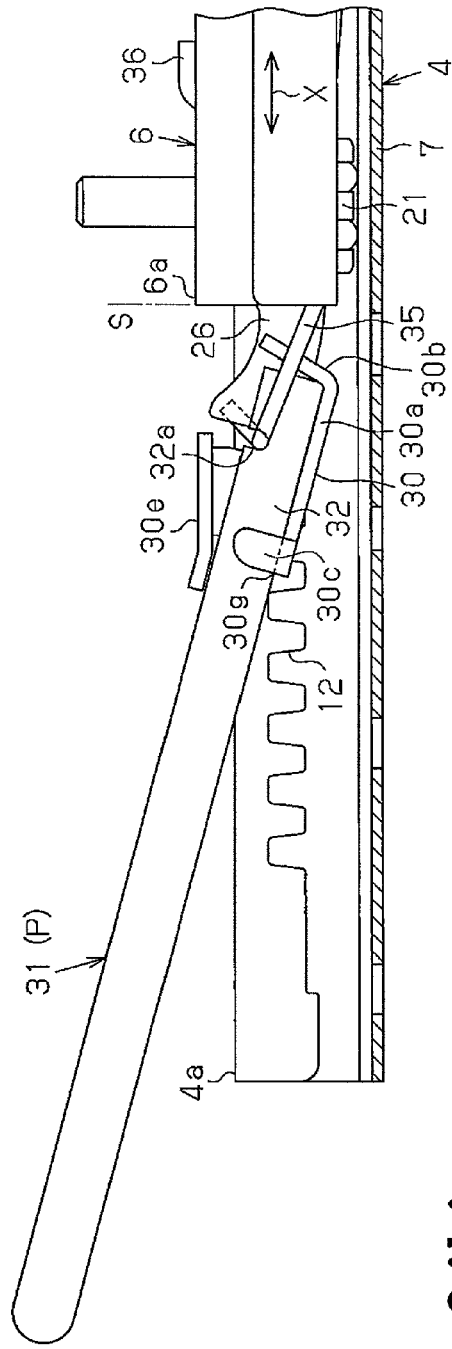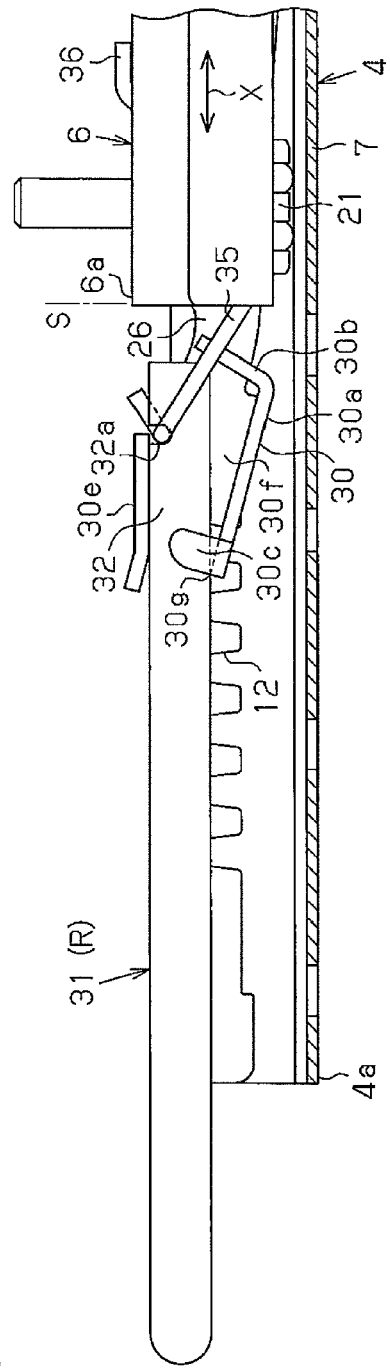

US 8,770,534 B2

LOCK MECHANISM FOR SEAT TRACK SLIDE DEVICE

BACKGROUND OF THE INVENTION

The present invention relates to a seat track slide device for a vehicle and, specifically, a lock mechanism for selectively restricting and permitting movement of an upper rail relative to a lower rail.

A conventional lock mechanism for a seat track slide device is disclosed in, for example, Japanese Laid-Open Patent Publication No. 2005-225386. The lock mechanism includes a pair of lower rails, a pair of upper rails, and a pair of lock levers. The lower rails are fixed to the floor and the upper rails are slidable on the corresponding lower rails. Each of the lock levers is accommodated in the corresponding one of the upper rails. Each lock lever is pivotally supported by a support shaft in the corresponding upper rail. The lock levers are connected to each other through a single handle. Each end of the handle is inserted into the corresponding upper rail from the front end of the upper rail and connected to the front end of the associated lock lever in the upper rail by means of an interlock support portion. Being interlocked by manipulation of the handle, the lock lever is selectively engaged with and disengaged from a lock hole of the corresponding lower rail.

In the conventional lock mechanism, each upper rail is formed like a channel, and each support shaft is supported between the side plates of the upper rail. Each lock lever is supported by the support shaft to be pivotable relative the upper rail. Therefore, the assembly of the upper rail, the lock lever, and the support shaft is problematic.

SUMMARY OF THE INVENTION

Accordingly, it is an objective of the present invention to provide a lock mechanism for a seat track slide device that facilitates assembly of an upper rail and a lock member (lock lever) at a part of the lock member pivotally supported by the upper rail, and maintains the assembled state of the upper rail and the lock member at the pivotally supported part.

To achieve the foregoing objective and in accordance with one aspect of the present invention, a lock mechanism for a seat track slide device is provided that is arranged between a floor and a seat in a vehicle and selectively restricts and permits sliding of the seat. The lock mechanism includes a pair of lower rails, a pair of upper rails, a plurality of lock portions, a lock member, a handle, a support portion, and a stopper portion. The lower rails are configured by a first lower rail and a second lower rail fixed to the floor. The upper rails are configured by a first upper rail and a second upper rail that are fixed to the seat and supported to be movable with respect to the first lower rail and the second lower rail, respectively. The lock portions are formed in at least the first lower rail out of the first and second lower rails. The lock portions are aligned in a movement direction of the first and second upper rails. The lock member is inserted into and attached to at least the first upper rail out of the first and second upper rails. The lock member has an end. The handle extends from the lock member. The support portion supports the lock member by means of engagement between a recessed portion formed in one of the first upper rail and the lock member and a projection formed in the other, such that the lock member is pivotable relative to the first upper rail. The stopper portion maintains the engagement between the recessed portion and the projection of the support portion. The first upper rail is switchable between a locking state, in which the first upper rail is locked to the first lower rail, and an unlocking state, in which the first upper rail is unlocked from the first lower rail, by selectively engaging and disengaging the lock member with respect to the lock portions through manipulation of the handle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1(a) is a side view schematically showing a seat arranged on a floor of a vehicle with a seat track slide device;

FIG. 1(b) is a cross-sectional side view illustrating the seat track slide device shown in FIG. 1(a) as a whole;

FIG. 6(a) is a cross-sectional side view showing a part of the seat track slide device in a normal state; and FIG. 6(b) is a cross-sectional side view showing the part of the seat track slide device in an unusual state.

DETAILED DESCRIPTION OF THE PREFERRED EMBODIMENTS

Figure 2:
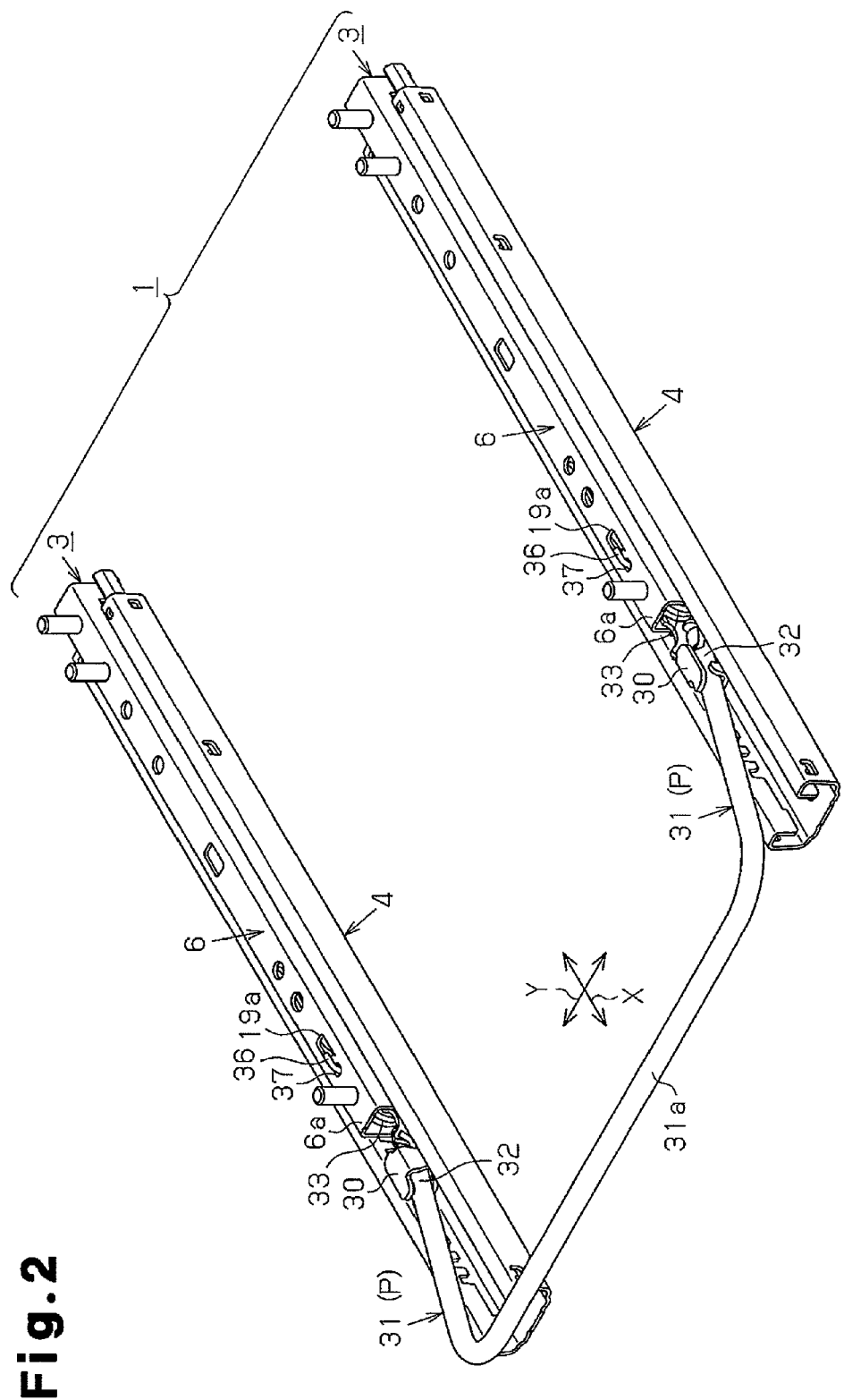
FIG. 2 is a perspective view showing the seat track slide device as a whole.
Figure 3:
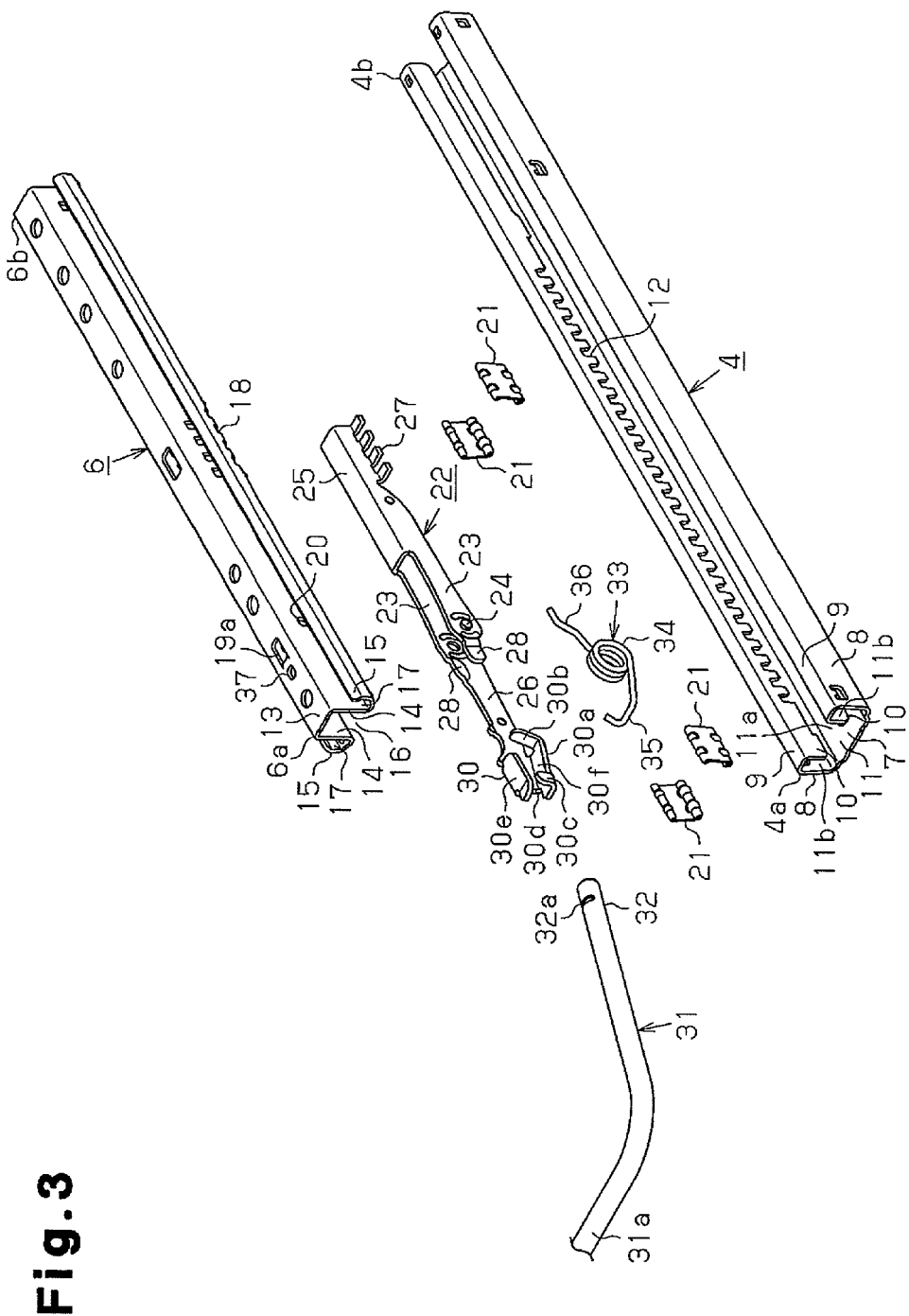
FIG. 3 is an exploded perspective view showing one seat track of the seat track slide device.

A lock mechanism for a seat track slide device according to one embodiment of the present invention will now be described with the attached drawings.

As schematically shown in FIG. 1(a), a seat track slide device 1 is attached to a floor 2 of a vehicle and has a pair of seat tracks 3, which extend in the fore-and-aft directions X. The two seat tracks 3 are spaced from each other in the direction perpendicular to the fore-and-aft directions X, or, in other words, the widthwise direction of the vehicle. The seat tracks 3 are arranged in correspondence with both sides of a seat 5. Each of the seat tracks 3 includes a lower rail 4 and an upper rail 6. The lower rails 4 are fixed to the floor 2. Each of the upper rails 6, which is fixed to the corresponding one of the two sides of the seat 5, is inserted into the corresponding one of the lower rails 4 and supported to be movable in the fore-and-aft directions X.

FIG. 2 shows the seat track slide device 1 as a whole. With reference to FIG. 3 and FIGS. 5(a) to 5(d), the lower rail 4 of each seat track 3 extends in the fore-and-aft directions X between a front end 4a and a rear end 4b. Each of the lower rails 4 includes a bottom plate 7, a pair of side plates 8, a pair of top plates 9, and a pair of end plates 10. The two side plates 8 are bent upward from both sides of the bottom plate 7. The two top plates 9 are bent inward facing each other, from the upper ends of the corresponding side plates 8 and extend in the widthwise direction Y, which is perpendicular to the fore-and-aft direction, or, in other words, the movement direction of each upper rail 6. The two end plates 10 are bent downward from the corresponding top plates 9. The bottom plate 7, the side plates 8, the top plates 9, and the end plates 10 define an accommodation chamber 11. The accommodation chamber 11 has an opening 11a and a pair of grooves 11b. The opening 11a is formed between the end plates 10 and extends in the fore-and-aft directions X. Each of the grooves 11b is formed between the corresponding one of the side plates 8 and the corresponding one of the end plates 10, extending in the fore-and-aft directions X. The accommodation chamber 11 opens upward at the opening 11a and opens in the fore-and-aft directions X at the front end 4a and the rear end 4b. Each end plate 10 has a plurality of lock recesses 12 (lock portions), each of which extends upward from the lower end of the end plate 10. The lock recesses 12 are arranged in a prescribed range in the end plate 10 that is closer to the front end 4a and aligned in the fore-and-aft directions X.

As illustrated in FIGS. 3 and 5(a) to 5(d), each upper rail 6 extends in the fore-and-aft directions X between a front end 6a and a rear end 6b. The upper rail 6 has a top plate 13, a pair of side plates 14, and a pair of guide plates 15. The two side plates 14 are bent downward from both sides of the top plate 13 and spaced from each other at a certain interval in the widthwise direction Y. The two guide plates 15 are each bent outward from the lower end of the corresponding side plate 14 in the widthwise direction Y and project upward. The top plate 13 and the side plates 14 form an accommodation chamber 16. The accommodation chamber 16 opens downward and opens in the fore-and-aft directions X at the front end 6a and the rear end 6b. A groove 17 is formed between each side plate 14 and the associated guide plate 15. The groove 17 opens upward and opens in the fore-and-aft directions X at the front end 6a and the rear end 6b. A plurality of holes 18, which extend upward in each side plate 14 from the lower end of the associated guide plate 15, are formed substantially at a middle position in the side plate 14 and the guide plate 15 and aligned in the fore-and-aft directions X. A stopper plate 19, which is formed by a cutout 19a and supported in a cantilevered manner, is formed in the vicinity of the front end 6a of the top plate 13. The stopper plate 19 is bent downward and received in the accommodation chamber 16, as illustrated in FIG. 4. A support hole 20 (recessed portion) is formed in each side plate 14 and in the vicinity of the stopper plate 19.

With reference to FIGS. 1(b), 4(a), 4(b), and 5(a) to 5(d), each upper rail 6 is inserted into the accommodation chamber 11 of the corresponding lower rail 4. The top plate 13 and the side plates 14 of the upper rail 6 project upward from the opening 11a of the accommodation chamber 11. Each side plate 14 faces the corresponding end plate 10 of the lower rail 4. The guide plates 15 of the upper rail 6 are received in the corresponding grooves 11b of the lower rail 4, and the end plates 10 are received in the corresponding grooves 17 of the upper rail 6. In this state, guides 21 are arranged between the two side plates 8 of the lower rail 4 and the corresponding guide plates 15 of the upper rail 6, and engaged with the front ends 4a, 6a and the rear ends 4b, 6b. The guides 21 support the upper rail 6 in a manner movable in the fore-and-aft directions X relatively to the lower rail 4.

In a lock lever 22 (a lock member) of the seat track slide device 1, as illustrated in FIGS. 3 and 5(a) to 5(d), a pair of arm plates 23 extend in the fore-and-aft directions X while being spaced from each other at a certain interval in the widthwise direction Y. Each of the arm plates 23 is arranged adjacent to the corresponding one of the side plates 14 of the upper rail 6. Each arm plate 23 has a projection 24, which projects outward. A support plate 26 extends from one of the arm plates 23 at a position forward from the corresponding projection 24 and adjacent to the corresponding side plate 14 of the upper rail 6. An engageable portion 25, which connects the arm plates 23 together, is formed in the rear end portions of the arm plates 23 at a position rearward from the projections 24. A plurality of lock claws 27 (engagement portions) are formed on both sides of the engageable portion 25 to be aligned in the fore-and-aft directions X. The arm plate 23 having the support plate 26 includes a stopper plate 28, which is formed continuously from the support plate 26 at a position forward from the associated projection 24 and adjacent to the projection 24. The other arm plate 23 has a stopper plate 28 facing the stopper plate 28 of the aforementioned arm plate 23, which is arranged adjacent to the associated projection 24 and extends forward with respect to the projection 24 while supported in a cantilevered manner.

A method for attaching the lock lever 22 to the upper rail 6 will hereafter be described. With reference to FIGS. 1(b), 4(a), 4(b), and 5(a), the lock lever 22 is inserted into the accommodation chamber 16 of the upper rail 6 with the stopper plate 19 of the upper rail 6 in a state before being bent downward. Then, with the two arm plates 23 of the lock lever 22, which are aligned in the widthwise direction Y with respect to the side plates 14 of the upper rail 6, flexed toward each other, the projections 24 of the lock lever 22 are inserted into and engaged with the support holes 20 of the corresponding side plates 14. The stopper plate 19 of the upper rail 6 is then bent downward and received in the space between the two stopper plates 28 of the lock lever 22. In this manner, the projections 24 become pivotally engaged with the corresponding support holes 20. Each of the projections 24 and the corresponding one of the support holes 20 form a pivot support portion 29 (FIG. 5(a)). In each of the pivot support portions 29, engagement between the stopper plates 19, 28 prevents the projection 24 and the support hole 20 from separating from each other in the direction YB (FIG. 5(a)) opposite to the direction YF (FIG. 5(a)) in which the projection 24 and the support hole 20 are engaged with each other. This configuration maintains the support holes 20 and the corresponding projections 24 in engaged states. When the lock lever 22 pivots, the lock claws 27 of the lock lever 22 are selectively engaged with and disengaged from the corresponding lock recesses 12 of the lower rail 4 in the holes 18 of the upper rail 6.

An interlock support portion 30 is formed at the front end of the support plate 26 of the lock lever 22. The interlock support portion 30 projects into an outer zone S, which is located forward from the front end 6a of the upper rail 6. The interlock support portion 30 has a support chamber 30f surrounded by a bottom plate 30a, a rear plate 30b, two side plates 30c, 30d, and a top plate 30e.

Figure 4A:
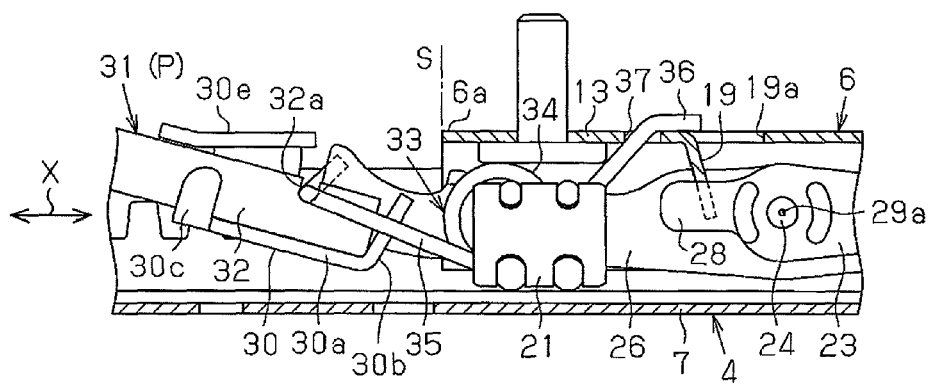
FIG. 4(a) is a cross-sectional side view showing a part of the seat track slide device.
Figure 4B:
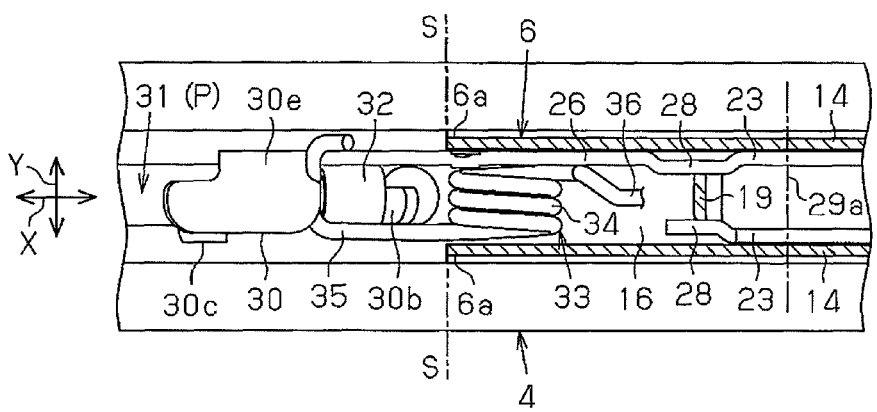
FIG. 4(b) is a cross-sectional view showing the part illustrated in FIG. 4(a), as viewed from above.
Figure 5A:
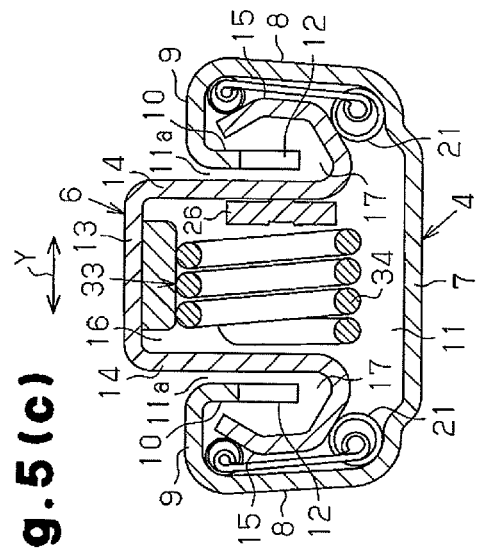
FIG. 5(a) is a cross-sectional view taken along line A-A of FIG. 1(b)
Figure 5B:
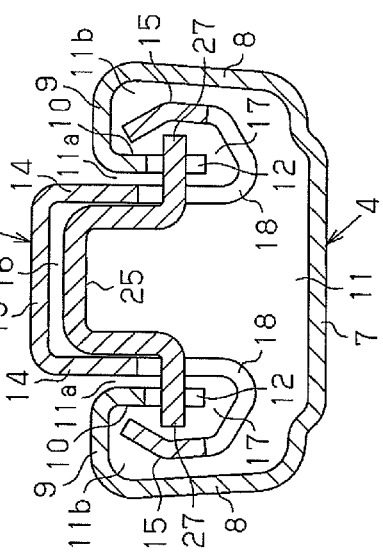
FIG. 5(b) is a cross-sectional view taken along line B-B of FIG. 1(b)
Figure 5C:
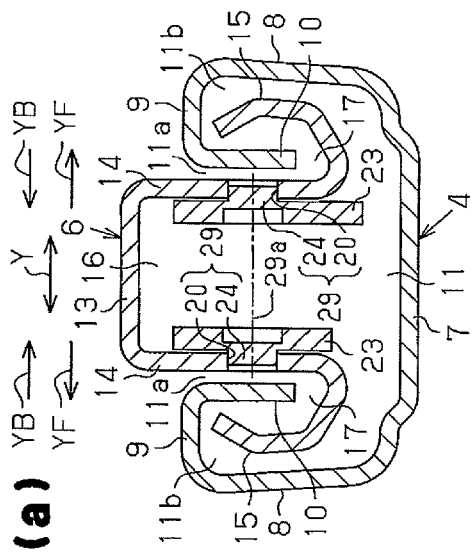
FIG. 5(c) is a cross-sectional view taken along line C-C of FIG. 1(b)
Figure 5D:
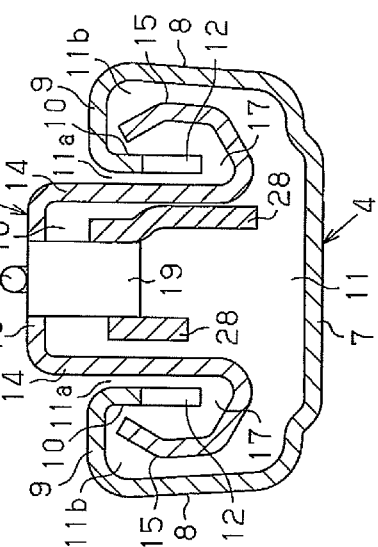
FIG. 5(d) is a cross-sectional view taken along line D-D of FIG. 1(b)

As shown in FIG. 2, a pair of bar-like handles 31 are connected to and interlocked with each other by a connecting portion 31a. With reference to FIG. 4(a), an interlock support portion 32 is arranged in the outer zone S with respect to the front end 6a of each upper rail 6 and formed at the proximal end of each handle 31. Each of the interlock support portions 32 is inserted into the support chamber 30f of the interlock support portion 30 of the corresponding one of the lock levers 22. Each interlock support portion 32 is thus supported by the bottom plate 30a, the rear plate 30b, the side plates 30c, 30d, and the top plate 30e. A hook groove 32a is formed in the outer circumference of the interlock support portion 32 of each handle 31.

A torsion coil spring 33 has a coil portion 34, a first arm portion 35, and a second arm portion 36. The arm portions 35, 36 extend from the coil portion 34. The torsion coil spring 33 is inserted into the accommodation chamber 16 from the front end 6a of each upper rail 6. The coil portion 34 of each torsion coil spring 33 is received in the accommodation chamber 16 at a position in the vicinity of the front end 6a of the corresponding upper rail 6. The coil portion 34 is arranged between the interlock support portion 30 and the two arm plates 23 of the associated lock lever 22 and between the support plate 26 of the lock lever 22 and the corresponding side plate 14 of the upper rail 6 in such a manner as to minimize the gap between the support plate 26 and the side plate 14. The coil portion 34 restricts movement of the lock lever 22 in the widthwise direction Y, thereby preventing deformation of the lock lever 22. The first arm portion 35 of each torsion coil spring 33 projects from the front end 6a of the associated upper rail 6 into the outer zone S with respect to the front end 6a. The first arm portion 35 is thus received in the support chamber 30f of the interlock support portion 30 in the outer zone S and supported by the hook groove 32a of the interlock support portion 32 of the corresponding handle 31. The second arm portion 36 is supported by the top plate 13 of the upper rail 6 by means of the hook hole 37. By positioning the first and second arm portions 35, 36, the torsion coil spring 33 is prevented from moving in the fore-and-aft directions X. Since the coil portion 34 is supported by the top plate 13 of the upper rail 6, elastic force is generated by the first arm portion 35.

The seat track slide device 1 operates in the manner described below.

When each handle 31 is at the lock position P illustrated in FIGS. 1(b), 2, 4(a), and 4(b), the elastic force produced by the torsion coil spring 33 pivots the interlock support portion 32 of the handle 31 downward about a fulcrum portion 30g (FIG. 6(a)), which is the front end of the bottom plate 30a in the support chamber 30f of the interlock support portion 30 of the associated lock lever 22, thus causing contact between the interlock support portion 32 and the bottom plate 30a. This pivots the interlock support portion 30 of the lock lever 22 downward about a pivot axis 29a of the pivot support portion 29 and the engageable portion 25 of the lock lever 22 upward about the pivot axis 29a of the pivot support portion 29, thus switching the lock mechanism to a locking state. The lock claws 27 of the engageable portion 25 are thus engaged with the corresponding lock recesses 12 of the lower rail 4. By raising the handle 31 against the elastic force of the torsion coil spring 33, the handle 31 is lifted from the locking position P to an unlocking position. This causes the interlock support portion 30 of the lock lever 22 to be interlocked with the interlock support portion 32 of the handle 31 and pivot upward about the pivot axis 29a of the pivot support portion 29. The engageable portion 25 of the lock lever 22 thus pivots downward about the pivot axis 29a of the pivot support portion 29, switching the lock mechanism to an unlocking state. As a result, the lock claws 27 of the engageable portion 25 are separated from the lock recesses 12 of the lower rail 4.

If the lower rail 4 and the upper rail 6 of each seat track 3 are twisted relative to each other in a car collision, at least one of the handles 31, which are interlocked with each other, is switched from the lock position P to the impact torsion state R, as illustrated in FIG. 6(b). This pivots the interlock support portion 32 of the handle 31 upward about the fulcrum portion 30g, which is the front end of the bottom plate 30a in the support chamber 30f of the interlock support portion 30 of the lock lever 22, against the elastic force of the torsion coil spring 33. The interlock support portion 32 thus separates from the bottom plate 30a. In this state, pivoting of the handle 31 is not transmitted as pivoting motion to the lock lever 22. As a result, the lock lever 22 is maintained in the locking state.

The illustrated embodiment has the advantages described below.

(1) When the lock lever 22 is inserted into the upper rail, the arm plates 23 of the lock lever 22 are flexed to approach each other against elasticity. This allows the projections of the arm plates 23 of the lock lever 22 to be engaged with the support holes 20 of the side plates of the upper rail 6 in the pivot support portion 29. Therefore, the lock lever 22 is easily assembled with the upper rail 6.

(2) After the lock lever 22 is assembled with the upper rail 6, the stopper plate 19 of the top plate 13 of the upper rail 6 is bent so as to be inserted and held between the stopper plates 28 of the arm plates 23 of the lock lever 22. Therefore, the projections 24 are prevented from coming off the support holes 20 in the pivot support portion 29.

(3) The pivot support portion 29 is located between the lock claws 27 of the lock lever 22 and the handle 31. Therefore, when a part of the lock lever 22 that is close to the handle 31 is pivoted downward by the elasticity of the torsion coil spring 33, the lock claws 27 are pivoted upward and engaged with the lock recesses 12 of the lower rail 4. In contrast, when a part of the lock lever 22 that is close to the handle 31 is pivoted upward against the elasticity of the torsion coil spring 33, the lock claws 27 are pivoted downward and disengaged from the lock recesses 12 of the lower rail 4. Thus, the lock claws 27 can be easily engaged with and disengaged from the lock recesses 12 of the lower rail 4 through manipulation of the handle 31.

(4) A part of the lock lever 22 between the projections 24 and the lock claws 27 needs to be shaped to have a high rigidity. In contrast, the stopper plate 19 of the top plate 13 of the upper rail 6 and the stopper plates 28 of the arm plates 23 of the lock lever 22 are located between the pivot support portion 29 and the handle 31. Therefore, in the part of the lock lever 22 between the projections 24 and the handle 31, the stopper plate 19 of the top plate 13 can be formed to have a shape that is easily inserted and held between the stopper plates 28 of the arm plates 23.

(5) The handle 31 is coupled to the support plate 26, which extends from one of the arm plates 23 each having the stopper plate 28 in the lock lever 22. Therefore, a space is formed about the support plate 26, and an end is formed in the arm plate 23 that has no support plate 26. The end is located in the vicinity of the corresponding projection 24. Thus, parts of the arm plates 23 that are located between the projections 24 and the handle 31 and spaced from each other, or the stopper plates 28, can be formed into a shape that easily receives and holds the stopper plates 19 of the top plate 13 of the upper rail 6.

(6) In the lock lever 22, one of the stopper plate 28 that faces the stopper plate 28 having the support plate 26 extends in a cantilever-like manner and functions as a leaf spring. Accordingly, the cantilever-like stopper plate 28 is easily flexed, which allows the stopper plate 19 of the top plate 13 of the upper rail 6 to be easily inserted and held between the stopper plate 28 of the arm plates 23 of the lock lever 22. Also, the stopper plates 19, 28 are adjacent to the pivot support portion 29. This further improves the function to prevent the projections 24 and the support holes 20 from separating from each other in the pivot support portion 29.

The illustrated embodiment may be modified to be in the forms described below.

In the above illustrated embodiment, the stopper plate 19 is provided in the top plate 13 of the upper rail 6, and a pair of the stopper plates 28 are provided in the arm plates 23 of the lock lever 22. Instead of this, stopper plates may be provided in components other than the upper rail 6 and the lock lever 22, and those components may be attached to the upper rail 6.

In the above illustrated embodiment, a pair of the support holes 20 are formed through the side plates 14 of the upper rail 6 at the pivot support portion 29, and the lock lever 22 has a pair of the projections 24. Instead of this, a pair of projections may be formed on the side plates 14 of the upper rail 6, and a pair of support holes may be formed through the lock lever 22. In place of support holes, holes with bottoms, or recessed portions, may be formed.

In the above illustrated embodiment, the stopper plate 19 of the top plate 13 of the upper rail 6 and the stopper plates 28 of the arm plates 23 of the lock lever 22 are located adjacent to the pivot support portion 29 and between the pivot support portion 29 and the handle 31. Instead, the stopper plates 19, 28 may be located adjacent to the pivot support portion 29 and between the pivot support portion 29 and the lock claws 27 of the lock lever 22.

In the above illustrated embodiment, the support plate 26 extends from one of the arm plates 23 of the lock lever 22, and the interlock support portion 30 is provided in the support plate 26. The interlock support portion 30 is coupled to the interlock support portion 32 of the handle 31. Instead of this, a support plate may extend from each arm plate, and an interlock support portion may be provided in each support plate. These interlock support portions are coupled to the interlock support portion of the handle.

The present invention is embodied as, by way of example, a seat track slide device 1 having the handles 31 of the seat tracks 3 that are interlocked with each other. However, the invention may be used in a seat track slide device having a lock mechanism only in one of the seat tracks. In this case, the lock lever 22 and the handle 31 are provided only in one of the upper rails 6 and the lock recesses 12 are arranged only in one of the lower rails 4.

Therefore, the present examples and embodiments are to be considered as illustrative and not restrictive and the invention is not to be limited to the details given herein, but may be modified within the scope and equivalence of the appended claims.

The invention claimed is:

1. A lock mechanism for a seat track slide device that is arranged between a floor and a seat in a vehicle and selectively restricts and permits sliding of the seat, the lock mechanism comprising:
    a pair of lower rails configured by a first lower rail and a second lower rail fixed to the floor;
    a pair of upper rails configured by a first upper rail and a second upper rail that are fixed to the seat and supported to be movable with respect to the first lower rail and the second lower rail, respectively;
    a plurality of lock portions that are formed in at least the first lower rail of the first and second lower rails, the lock portions being aligned in a movement direction of the first and second upper rails;
    a lock member that is inserted into and attached to at least the first upper rail of the first and second upper rails, the lock member having an end;
    a handle extending from the lock member;
    a support portion that supports the lock member by means of engagement between a recessed portion formed in one of the first upper rail and the lock member and a projection formed in the other, such that the lock member is pivotable relative to the first upper rail; and
    a stopper portion that maintains the engagement between the recessed portion and the projection of the support portion, by limiting movement of the lock member in a widthwise direction which is perpendicular to the movement direction of the first upper rail, wherein the stopper portion includes:
    a pair of first stopper portions provided in the lock member, and a second stopper portion provided on the first upper rail, the second stopper portion comprising a tab bent downwardly from the first upper rail and being inserted and held between the first stopper portions;
    wherein the first upper rail is switchable between a locking state, in which the first upper rail is locked to the first lower rail, and an unlocking state, in which the first upper rail is unlocked from the first lower rail, by selectively engaging and disengaging the lock member with respect to the lock portions through manipulation of the handle.

2. The lock mechanism for a seat track slide device according to claim 1, wherein:
    the first upper rail includes a pair of side plates and a top plate, the side plates being aligned and spaced along the widthwise direction of the first upper rail, and the top plate connecting the upper ends of the side plates to each other;
    the lock member includes a pair of arm plates located between the side plates of the first upper rail, the arm plates being aligned and spaced along the widthwise direction of the first upper rail;
    one of the recessed portion and the projection of the support portion is formed in the side plates of the first upper rail, and the other is formed in the arm plates of the lock member.

3. The lock mechanism for a seat track slide device according to claim 2, wherein the lock member includes an engagement portion that is selectively engaged with and disengaged from the lock portions, and the support portion being located between the engagement portion of the lock member and the handle and provided in each of the side plates of the first upper rail and the arm plates of the lock member.

4. The lock mechanism for a seat track slide device according to claim 3, wherein the first stopper portions and the second stopper portion are provided between the support portion and the handle.

5. The lock mechanism for a seat track slide device according to claim 4, wherein the arm plates include a first arm plate and a second arm plate, and a support plate extends from at least the first arm plate of the first and second arm plates, the handle being coupled to the support plate.

6. The lock mechanism for a seat track slide device according to claim 5, wherein, in the lock member, the first arm plate includes one of the first stopper portions, which is between the support portion and the support plate, continuous with the support plate and is adjacent to the support portion, and the second arm plate includes the other first stopper portion, which is paired with and faces the first stopper portion of the first arm plate, the first stopper portion of the second arm plate being adjacent to the support portion.

* * * * *